United States Patent
Tzeng et al.

(10) Patent No.: US 10,361,420 B2
(45) Date of Patent: Jul. 23, 2019

(54) METHODS FOR MAKING LEAD-CARBON COUPLINGS, LEAD-CARBON ELECTRODE SHEETS AND LEAD-CARBON BATTERIES

(71) Applicant: INSTITUTE OF NUCLEAR ENERGY RESEARCH, ATOMIC ENERGY COUNCIL, EXECUTIVE YUAN, R.O.C., Taoyuan (TW)

(72) Inventors: Yi-Ren Tzeng, Taoyuan (TW);
Sheng-Hsiang Chiang, Taoyuan (TW);
Wen-Chen Liao, Taoyuan (TW);
Ann-Tinn Shen, Taoyuan (TW);
Shu-Huei Hsieh, Yunlin County (TW);
Yi-Cheng Su, Yunlin County (TW);
Ya-Wun Jan, Yunlin County (TW);
Anthony Shiaw-Tseh Chiang, Taoyuan (TW)

(73) Assignee: Institute of Nuclear Energy Research, Atomic Energy Council, Executive Yuan, R.O.C., Taoyuan (TW)

( * ) Notice: Subject to any disclaimer, the term of this patent is extended or adjusted under 35 U.S.C. 154(b) by 329 days.

(21) Appl. No.: 15/256,933

(22) Filed: Sep. 6, 2016

(65) Prior Publication Data
US 2017/0263912 A1    Sep. 14, 2017

(30) Foreign Application Priority Data
Mar. 8, 2016    (TW) .............................. 105107103 A

(51) Int. Cl.
*H01M 4/56* (2006.01)
*H01M 4/36* (2006.01)
*H01M 2/28* (2006.01)
*B22D 19/08* (2006.01)
*B22D 25/04* (2006.01)
(Continued)

(52) U.S. Cl.
CPC .............. *H01M 2/28* (2013.01); *B22D 19/08* (2013.01); *B22D 25/04* (2013.01); *H01G 11/26* (2013.01); *H01G 11/30* (2013.01); *H01G 11/32* (2013.01); *H01G 11/86* (2013.01); *H01M 4/0471* (2013.01); *H01M 4/0485* (2013.01); *H01M 4/366* (2013.01); *H01M 4/56* (2013.01);
(Continued)

(58) Field of Classification Search
None
See application file for complete search history.

(56) References Cited

FOREIGN PATENT DOCUMENTS

JP            57158954 A  *  9/1982  .............. H01M 4/64

OTHER PUBLICATIONS

English abstract of Sekiguchi JP 57158954 A. (Year: 1982).*

(Continued)

*Primary Examiner* — Wojciech Haske
(74) *Attorney, Agent, or Firm* — Rosenberg, Klein & Lee

(57) ABSTRACT

Methods for making lead-carbon coupling, lead-carbon electrode sheets, and a lead-carbon battery are revealed. The coupling methods consist of steps of assembling the carbon material that contains oxygen functional groups or metal precursors and lead material in contact with each other and then heating the assembled lead-carbon pair to form lead oxides or metal carbides as a bridge to form coupled lead-carbon interface with high electrochemical and mechanical stability. This coupled lead-carbon structure is applied to form lead-carbon electrode sheets and is further used as electrode sheets of lead-carbon batteries by lead welding.

6 Claims, 8 Drawing Sheets

(51) Int. Cl.
  *H01M 4/04* (2006.01)
  *H01M 4/583* (2010.01)
  *H01M 4/62* (2006.01)
  *H01M 4/66* (2006.01)
  *H01G 11/26* (2013.01)
  *H01G 11/30* (2013.01)
  *H01G 11/32* (2013.01)
  *H01G 11/86* (2013.01)

(52) U.S. Cl.
  CPC .......... *H01M 4/583* (2013.01); *H01M 4/628* (2013.01); *H01M 4/663* (2013.01)

(56) References Cited

OTHER PUBLICATIONS

Ajayan et al. "Opening carbon nanotubes with oxygen and implications for filling" Nature, vol. 362, p. 522.(1993) (Year: 1993).*
Yi-Ren Tzeng, et al., Surface Modifications of Carbon Materials for the Fabrication of Lead-Carbon Ohmic Contacts (Presentation Abstract for Sep. 9, 2015 Presentation), http://16abc.conferenceworks.com.au/presentation/abstracts/ p. 44.
Program, 16th Asian Battery Conference (Sep. 8-11, 2016), http://16abc.conferenceworks.com/au/presentation/program/.

* cited by examiner

METHODS FOR MAKING LEAD-CARBON COUPLINGS, LEAD-CARBON ELECTRODE SHEETS AND LEAD-CARBON BATTERIES

BACKGROUND OF THE INVENTION

Field of the Invention

The present invention relates to methods, especially to methods of making lead-carbon couplings such that the interfaces of the carbon materials and the lead materials are joined together with high electrochemical and mechanical stability. These lead-carbon coupling methods are used in forming lead-carbon electrode sheets which are further applied to form electrode sheets of lead-carbon batteries by lead welding.

Descriptions of Related Art

Power storage plays a key role in power management and broader use of renewable energy. In general, power can be stored either by the physical or the electrochemical methods. The electrochemical batteries have become a priority in micro-grid energy storage because they meet requirements of quick charge/discharge and high storage capacity.

For the electrochemical methods, the hybrid lead-carbon battery system formed by electronically connecting in parallel a conventional lead-acid battery and an asymmetric electrochemical supercapacitor provides a viable and economical method for power storage. The supercapacitor acting as a buffer in fast charging/discharging conditions can inhibit the sulfation of the negative electrode (lead plate) of the battery during high rate partial state of charge (HRPSoC) process. By extending the cycle life of the batteries, the cost for each charge/discharge cycle is significantly reduced.

In conventional lead acid batteries, the sulfation occurs when non-conductive lead sulfate ($PbSO_4$) crystals are deposited on the surfaces of the negative electrode during discharge. For deep discharge conditions or during the HRPSoC processes, the sizes of the non-conductive lead sulfate crystals would increase. As the active surface areas of the lead, plate is reduced, the storage capacity and the cycle life of the batteries decrease One method to reduce the sulfation is to add porous carbon materials on the lead electrode. However, because the carbon materials are very chemically inert, it is very difficult to form a stable lead-carbon interface. Moreover, the porous carbon materials are mostly available in powders which can only be sintered under high pressure (about 400 MPa) and high temperature (about 950° C.) conditions. The lack of a convenient method to form stable lead-carbon couplings limits the maximum amount of the added carbon materials to ~5 wt %.

Another method to reduce the sulfation is to use the bi-electrode approach in the internal parallel hybrid systems. In this approach, the negative electrode consists of two plates, one being a conventional lead plate and the other a porous carbon plate with high specific surface areas. The porous carbon plate acts as a capacitor to absorb high currents on the bi-electrode system during change and discharge, consequently reducing the current experienced by the lead plate and thus minimizing the sulfation.

Although the bi-electrode approach in the internal hybrid system that combines the conventional lead-acid batteries and asymmetric supercapacitors in one battery cell provides a method for low-cost power storage, the lead-carbon interface at the junctions of the carbon and the lead plate is easily subjected to corrosion because the carbon and the lead are only joined physically. Without forming chemical bonds, the lead at the lead-carbon interfacial region can be easily attacked by the bisulfate ion [$HSO_4^-$] to form the electronically non-conductive lead sulfate during discharge. With the accumulation of the non-conductive lead sulfate, the electronic connections at the lead-carbon interface become unreliable and eventually fail. The increase of the contact resistance gives rise to decreased power storage efficiency and low cycle life.

To enhance the electrochemical stability of the lead-carbon interface, various surface modification methods on carbon materials had been used. In some chemical impregnation methods, oxygen functional groups are formed as the anchoring sites for the metal precursors. In some bridging methods, noble metal catalysts, such as Pt and Pd, are used as a bridge to connect the carbon and the lead. In another method, diamond-like carbon layers are grown on the carbon surfaces as a buffer layer to enhance the wetting of the lead on carbon.

Among the many demands for making an electrochemically stable lead-carbon interface, demand for more efficient and lower cost fabrication methods has become increasing popular. Accordingly, there is room for improvement and a need to provide a simple and facile method to form chemical bonding between the lead and the carbon without using the expensive noble metals, or complex chemical pretreatment procedures, or complicated vacuum deposition process. The method can be applied for the fabrication of an electrochemically stable lead contact on the carbon electrode sheets. Such carbon electrode sheets made with a stable lead contact can further be applied for the fabrication of hybrid lead-carbon batteries by directly connecting together the lead contacts on the negative plate in the conventional lead acid battery cell and that on the carbon electrode sheets. This provides a low cost method for mass production of the hybrid lead-carbon batteries.

SUMMARY OF THE INVENTION

Therefore it is a primary object of the present invention to provide a method for making lead-carbon couplings by forming highly stable chemical bonds between the lead and the carbon materials using lead oxides as the bridging materials. By this method, metallic lead oxides are formed at the lead-carbon interface by thermally decomposing the oxygen functional groups on the carbon materials. The thermal decomposing process creates oxygen containing radicals that react immediately with the adjacent lead atoms to form lead oxides and wet the surfaces of the carbon materials. The wetted lead oxides can further react with the underlying carbon atoms to form strong chemical bonds that are resistant to the attack of sulfuric acid and highly electrochemically stable under redox conditions.

Another object of the present invention is to provide a method for making lead-carbon coupling by forming highly stable chemical bonds between the lead and the carbon materials using lead oxides as the bridging materials in a vacuum chamber under oxygen controlled atmosphere. By this method, the oxygen from the controlled atmosphere is used to react and form thin lead oxide layers on the surfaces of the lead at high temperatures. Those lead oxides react with the carbon atoms in close contact with the surfaces of the lead and then wet the surfaces of the carbon materials to form highly stable chemical bonds at the lead-carbon interface. The amount of oxygen in the controlled atmosphere is kept low to avoid significant oxidation of the carbon materials.

It is a further object of the present invention to provide a method for making lead-carbon coupling by forming highly stable chemical bonds between the lead and the carbon materials using metal carbides as the bridging materials. By this method, carbon materials decorated with metal precursors and lead materials are held together in close contact with each other. Under high temperature, the metal element in the metal precursors reacts with the surfaces of the carbon materials to form metal carbide that in turn wet the lead surfaces.

It is a further object of the present invention to provide lead-carbon electrode sheets made by the methods mentioned above. During this process, the carbon and the lead materials are joined together by forming chemical bonds at the lead-carbon interface using the lead oxides or metal carbides as the bridging materials.

It is a further object of the present invention to provide a lead-carbon battery assembled by connecting the negative plate of a conventional lead acid battery to the lead-carbon electrode sheets by direct lead welding.

In order to achieve these above objects, a method for making lead-carbon coupling consists of the following steps. First, a carbon material containing a plurality of oxygen functional groups and a lead material are assembled in such a configuration that a first surface of the carbon material is in contact with the lead material. Then, the assembled lead-carbon configuration is heated to a first temperature such that the oxygen functional groups on the first surface react with the lead in contact with the first surface to form lead oxides at the lead-carbon interface. Then, the coupled lead-carbon assembly is cooled down to room temperature.

Another method for making lead-carbon coupling consists of the following steps. First, a carbon material and a lead material are assembled in a controlled atmosphere in such a configuration that a first surface of the carbon material is in contact with the lead material. Then, the assembled lead-carbon configuration is heated to a first temperature such that the oxygen in the controlled atmosphere reacts with the lead to form lead oxides which in turn wets the carbon at the lead-carbon interface. Then, the coupled lead-carbon assembly is cooled down to room temperature. The oxygen pressure in the controlled atmosphere is kept low to prevent significant oxidation of the carbon materials at the first temperature.

Another method for making lead-carbon coupling in the present invention consists of the following steps. First, a carbon material with a first surface decorated with a plurality of metal precursors and a lead material are provided. The metal precursors contain at least a metal element that can react with the carbon material to form metal carbide at a second temperature. Then, the carbon and the lead materials are assembled in such a configuration that the first surface of the carbon material is in close contact with the lead material. Then, the assembled lead-carbon configuration is heated to a second temperature such that at least one metal element reacts with the carbon to form a metal carbide which in turn moistens the lead at the lead-carbon interface. Then, the coupled lead-carbon assembly is cooled down to room temperature.

Methods for making lead-carbon electrode sheets in the present invention consist of the following steps. First, a sheet of a porous carbon material and that of a lead material are provided. Then, the first surface of the porous carbon sheet is coupled to the lead material using the lead oxides or the metal carbides as a bridge to form an electrochemically and mechanically stable lead-carbon interface. Portions of the lead-carbon interface on the outer surface of the lead-carbon electrode sheets are coated with lead materials, providing contact points for lead welding. A lead-carbon battery of the present invention consists of a lead-acid battery electrode assembly and a lead-carbon electrode sheet. The lead-acid battery electrode assembly has a positive electrode and a negative electrode. The lead-carbon electrode sheet is connected to the negative electrode of the lead-acid battery electrode assembly by lead welding.

BRIEF DESCRIPTION OF THE DRAWINGS

The structure and the technical methods adopted in the present invention to achieve the designated objects can be more easily understood by referring to the following description of the preferred embodiments and the accompanying drawings, wherein.

DETAILED DESCRIPTION OF THE PREFERRED EMBODIMENT

In order to better understand the features and the functions of the present invention, please refer to the following embodiments and the related figures.

Figure 1:
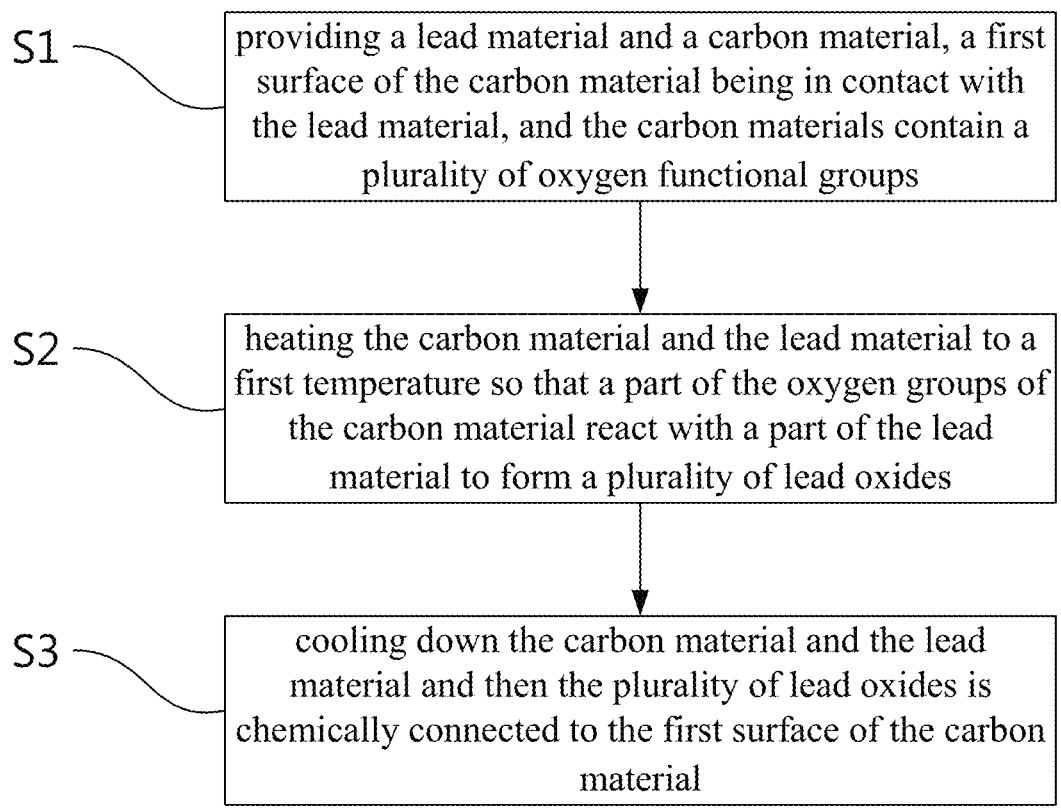
FIG. 1 is a flowchart of an embodiment of the present invention showing the steps for one of the lead-carbon coupling methods that use the lead oxides as a bridge to chemically join together the lead and carbon materials.

As shown in FIG. 1, a method for making an electrochemically stable lead-carbon coupling consists of the following steps.

Step S1: provide a carbon material and a lead material assembled in such a configuration that a first surface of the carbon material is in contact with the lead material while the carbon material includes a plurality of oxygen functional groups connected to the first surface of the carbon material;

Step S2: heat the assembled lead and carbon materials to a first temperature so that a part of oxygen functional groups reacts with a part of the lead material to form lead oxides that are coupled to the carbon and the lead materials; and Step S3: cool down the coupled carbon and lead materials; a part of the lead material that already forms lead oxides is chemically connected to the first surface of the carbon material in which a part of oxygen groups had been decomposed.

Figure 2:
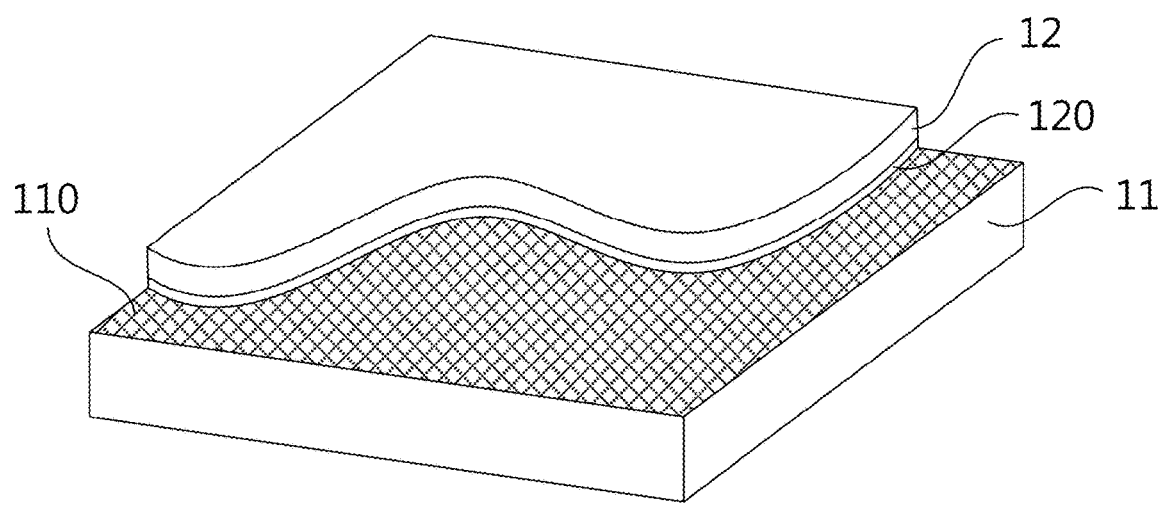
FIG. 2 is a schematic drawing of an embodiment of the present invention showing the structure of the coupled lead-carbon interface in which a bridging layer of lead oxide is formed between the carbon and the lead materials.

The structure of the coupled lead-carbon interface can be better understood by referring to the schematic drawing in FIG. 2. In FIG. 2, a carbon material 11 with a first surface 110 is coupled to the lead material 12 via a bridge layer of lead oxide 120. Without this lead oxide layer 120, the lead 12 cannot wet the carbon material 11 even at a temperature higher than the melting temperature of the lead 12. This is because that the lead has a surface tension of 470 mN/m which is much larger than that of the carbon material, 100~200 mN/m. As a result of the weak interaction between the lead and the carbon materials, the lead, when melts, will aggregate rather than forming a smooth wetting layer on the carbon material 12. Since the lead and the carbon are not tightly joined, the lead at the interface is subject to the attack of sulfuric acid giving rise to the formation of non-conducting lead sulfate. This reduces the mechanical strength and increases the contact resistance of the lead-carbon interface making the redox reactions difficult. To improve the wetting of the lead on the carbon materials, lead oxides 120 which are metallic and have a surface tension of 132 mN/m, comparable to that of carbon materials, 100-200 mN/m, are used as an interfacial layer to wet the carbon material 11 and the lead material 12, respectively. By forming a stable chemical bond with the carbon material 11 and the lead material 12, respectively, the tightly sealed lead-carbon interface is resistant to the attack of sulfuric acid under redox conditions and thus has high electrochemical and mechanical stability.

In an embodiment of the present invention, the lead oxide 120 is formed by heating the carbon materials 11 that contains oxygen functional groups and the lead materials 12. At the first temperature, the lead material 12 metals and a part of oxygen groups in the carbon materials 11 decomposes and reacts with the molten lead material 12 to form lead oxides 120. The lead oxides 120 thus formed has a structure of thin films sandwiched between the carbon material 11 and the lead material 12.

At the first temperature, a part of oxygen groups start decomposing, consequently, the first temperature varies for different carbon materials which contain different types of oxygen functional groups. For example, the carboxyl group (—COOH) is decomposed at 373~673K, the ester group (RCOOR') and carbonate ester group (ROCOOR) at 463~923K, the hydroxyl group (ROH) at 873~973K and the acyl group (RCO—), carbonyl group (RCOR'), aldehyde group (RCHO), ether group (ROR'), hydroperoxy group (ROOH) or peroxy group (ROOR) at 973~1253K.

The carbon materials used in the present invention can be carbon cloth, activated carbon, bamboo carbon or wood charcoal with a pore structure consisting of a plurality of mesopores or micropores. In a preferred embodiment, the step S2 further includes a step S21 of pressurizing the lead material to force the molten lead material entering the pore structure of the carbon material when the designated first temperature is higher than the melting temperature of the lead material. By pushing the molten lead into the pore structure, the contact area between the carbon material and the lead material increases. This also increases the coupling areas between the carbon and the lead materials as the oxygen functional groups in the pore structure of the carbon materials reacts with the lead inside at the first temperature.

In a preferred embodiment of the present invention, the step S2 is performed under controlled atmosphere with a low partial pressure of oxygen to prevent significant oxidation of carbon materials at the first temperature.

Figure 3A:
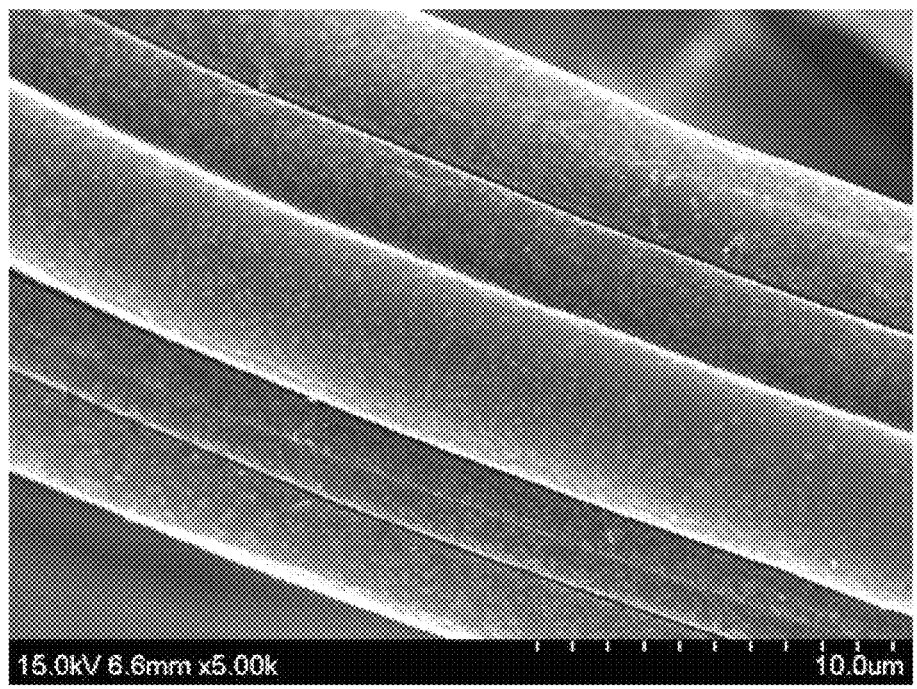
FIG. 3A is a secondary electron microscope (SEM) image of an embodiment of the present invention showing the morphology of the original carbon materials.
Figure 3B:
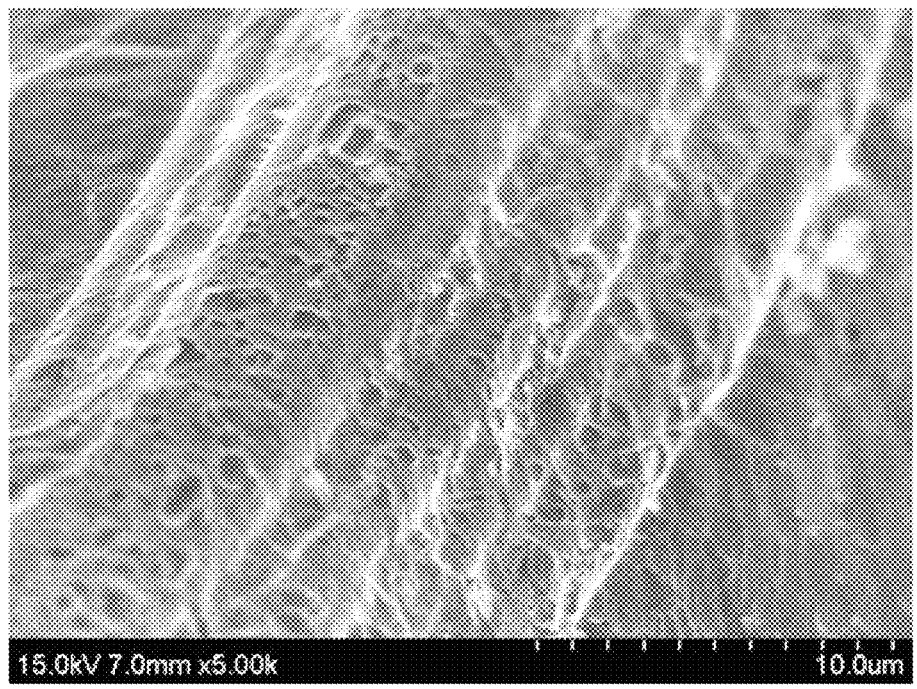
FIG. 3B is a SEM image of an embodiment of the present invention showing the feature of the coupled lead-carbon assembly with an interfacial layer of lead oxides completely wrapped around the carbon materials.

FIG. 3A shows the SEM images of the morphology of the carbon cloth used as the raw carbon materials in the preferred embodiment and FIG. 3B that of the coupled lead-carbon assembly. By comparing the two images, we found the coupled lead-carbon assembly has been completely covered with a layer of lead-carbon interface.

Figure 4:
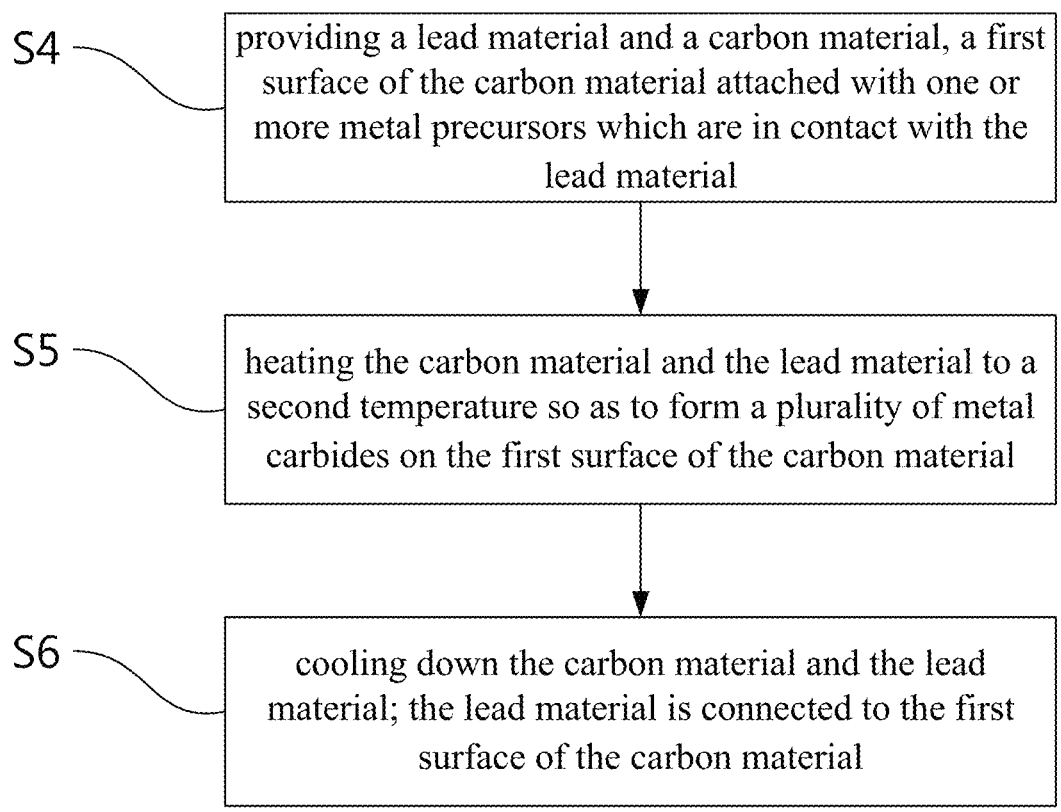
FIG. 4 is a flowchart of another embodiment of the present invention showing steps for one of the lead-carbon coupling methods that use the tungsten oxides as a bridge to chemically join together the lead and carbon materials.

As shown in FIG. 4, another method for making an electrochemically stable lead-carbon coupling consists of the following steps.

Step S4: provide a carbon material with a first surface decorated with a plurality of metal precursors and a lead material assembled in such a configuration that the metal precursor decorated the first surface of the carbon material is in contact with the lead material;

Step S5: heat the assembled lead and carbon materials to a second temperature such that at least one metal element in the metal precursors reacts with the carbon materials to form a metal carbide which in turn moistens the lead at the lead-carbon interface; and Step S6: cool down the coupled lead-carbon assembly; a part of the lead material is connected to the tungsten carbides formed on a part of the first surface of the carbon material.

Figure 5:
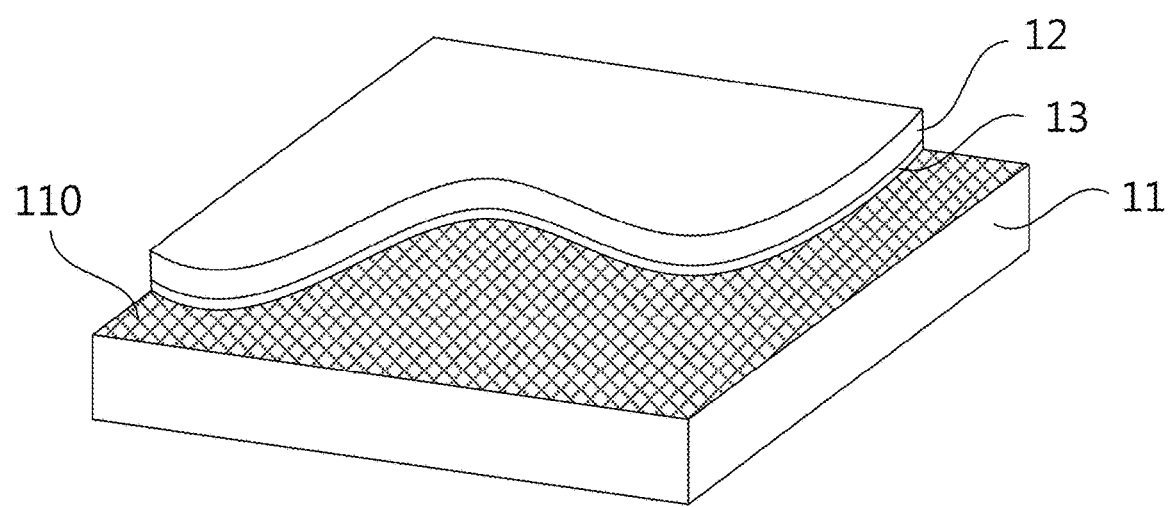
FIG. 5 is a schematic drawing of an embodiment of the present invention showing the structure of the coupled lead-carbon interface in which a bridging layer of tungsten carbides is formed between the carbon and the lead materials.

The structure of the coupled lead-carbon interface can be better understood by referring to the schematic drawing in FIG. 5. In this drawing, a carbon material 11 with a first surface 110 is coupled to the lead material 12 via a bridge layer of metallic tungsten carbides 13. In this embodiment, the second temperature is the formation temperature of the tungsten carbide 13.

Figure 6:
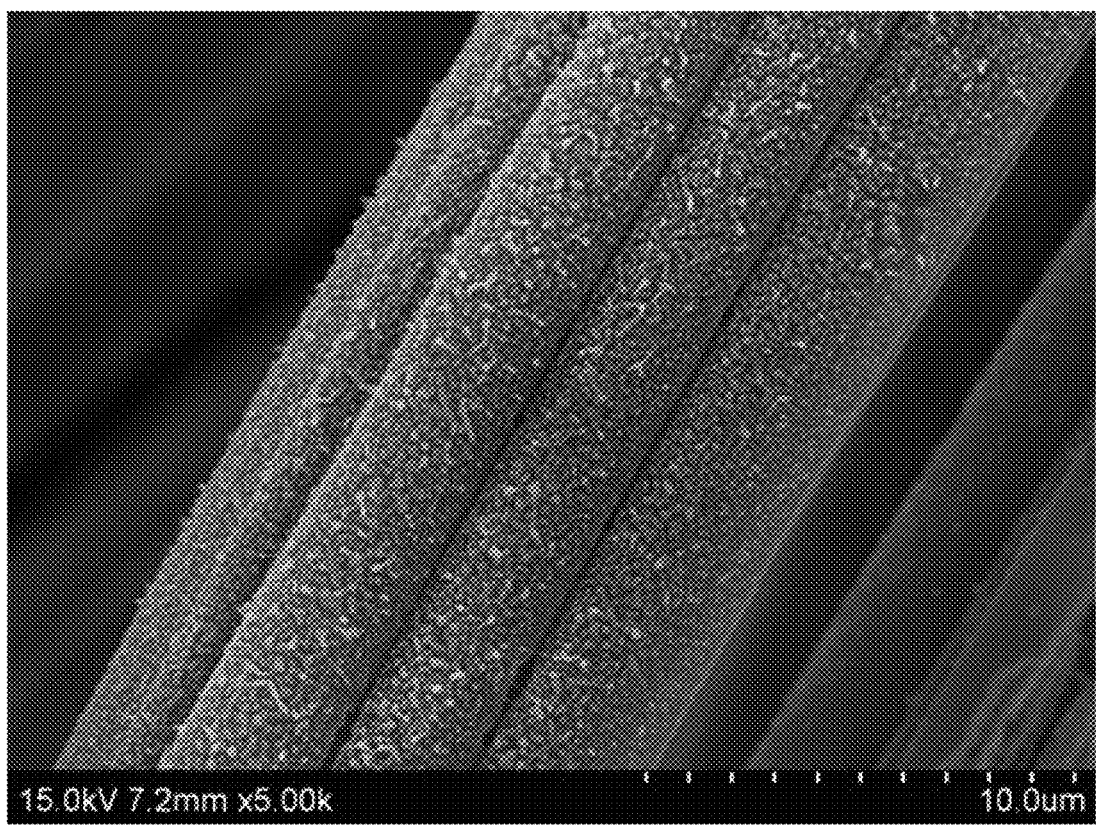
FIG. 6 is a SEM image of an embodiment of the present invention showing the feature of the coupled lead-carbon assembly with an interfacial layer of tungsten carbides decorated on the carbon materials.

FIG. 6 shows the SEM images of the morphology of the lead-carbon assembly using the tungsten carbides as the bridge layer. By comparing the images of the carbon cloth used as the raw carbon materials, we found the coupled lead-carbon assembly has been covered with a layer of densely packed tungsten carbide particles.

Figure 7A:
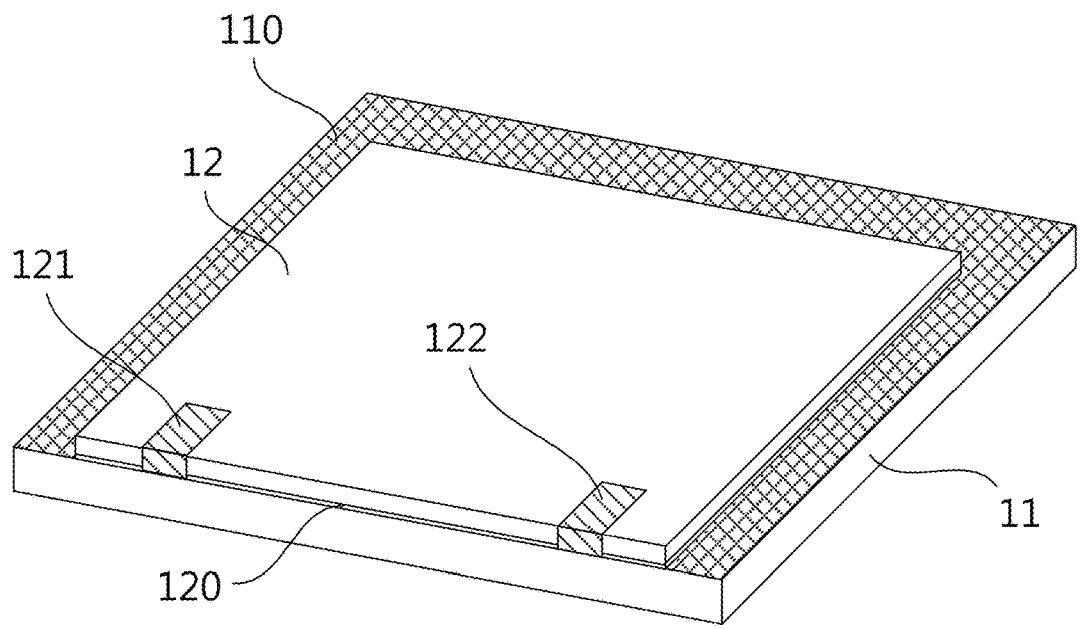
FIG. 7A is a schematic drawing of an embodiment of the present invention showing the structure of a lead-carbon electrode sheet made with lead welding points which are electronically connected to the carbon materials via an interfacial layer of lead oxides.
Figure 7B:
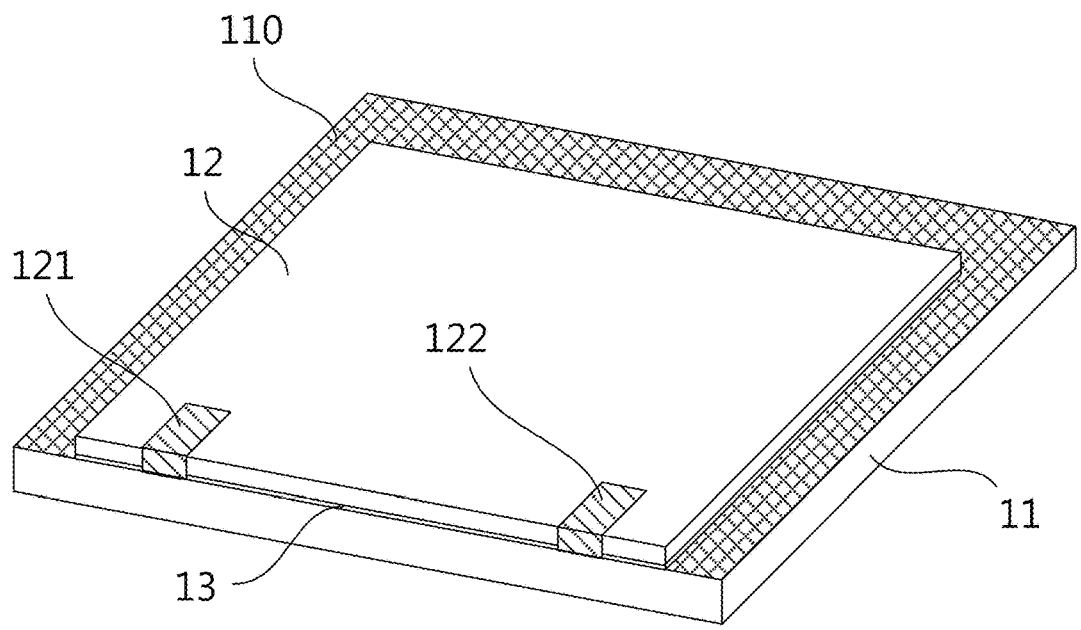
FIG. 7B is a schematic drawing of an embodiment of the present invention showing the structure of a lead-carbon electrode sheet made with lead welding points which are electronically connected to the carbon materials via an interfacial layer of tungsten carbides.

FIG. 7A shows a schematic drawing of the structure of a lead-carbon electrode sheet made in an embodiment of present invention. In this schematic drawing, the lead-carbon electrode sheet consists of a carbon material 11 and a lead material 12 disposed on a first surface 110 of the carbon material 11. The surface of the lead material 12 is coupled to the first surface 110 via a layer of lead oxides 120. In addition, the lead-carbon electrode sheet contains a plurality of welding points 121 and 122 that are located on an edge of the carbon material 11. These welding points 121 and 122 provide a place to be welded by lead welding. FIG. 7B shows a schematic drawing of another structure of a lead-carbon electrode sheet made in an embodiment of the present invention. In this schematic drawing, the surface of the lead material 12 is coupled to the first surface 110 via a layer of tungsten carbides 13.

With the built in welding points, the lead-carbon electrode sheets in the present invention can also be applied to simplify the assembling process of a lead-carbon battery. The structure of a lead-carbon battery mainly consists of a lead-acid battery electrode assembly and a lead-carbon electrode sheet. The lead-acid battery electrode assembly further consists of a positive electrode assembly and a negative electrode assembly. By electronically connecting the lead-carbon electrode to the negative electrode assembly of the lead-acid battery, a lead-carbon battery is formed. In other words, a lead-carbon battery can be made by simply lead welding the wedding points of the lead-carbon electrode to the negative electrode assembly of the lead-acid battery. This simplifies the assembly process of the lead-carbon battery. By using the carbon cloth as the raw carbon material, the lead-carbon electrode sheet also has the advantage of high specific surface areas, good electronic conductivity, and special mechanical properties such as light weight, compact volume, and shape flexibility.

Figure 8:
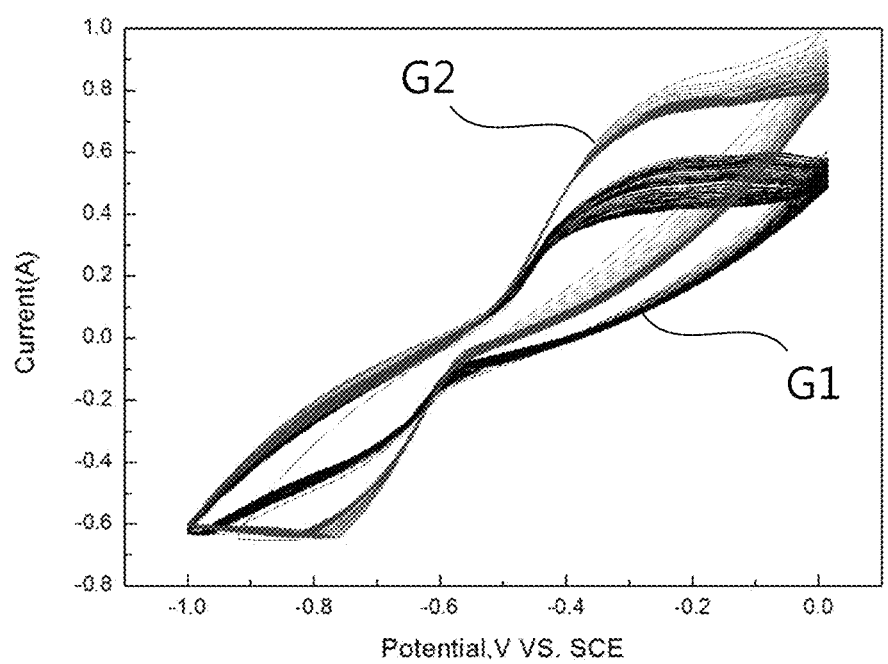
FIG. 8 shows the results of the cyclic voltammetry measurements of a lead oxide coupled lead-carbon electrode sheet in an embodiment of present invention.

FIG. 8 shows results of the cyclic voltammetry response of the lead-carbon electrode sheet made using the lead oxide as the interfacial coupling layer. Group one (G1) are the results of the first 100 CV cycles for a freshly made lead-carbon electrode sheet, and G2 are those of another 100 cycles after the electrode sheet had been immersed in the sulfuric acid and subjected to repetitive CV cycles for 14 days. The nearly identical CV results for the G1 and G2 groups show that the lead-carbon electrode sheet in the present invention has excellent electrochemical stability under redox conditions.

The present invention provides a novel method for lead-carbon coupling and a novel structure in which lead oxides or metal carbides are used as a bridge to form highly electrochemically stable lead-carbon interface with high mechanical strength. The lead-carbon coupling methods are further applied to produce lead-carbon electrode sheets and batteries. The present invention balances uniqueness of the manufacturing process, the reliability of the manufacturing process, and performance stability of the product.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A method for lead-carbon coupling comprising the steps of:
providing a lead material and a carbon material, a first surface of the carbon material being in continuous contact with the lead material, and the first surface of the carbon materials contain a plurality of oxygen functional groups;
heating the carbon material and the lead material to a first temperature so that a part of the existing oxygen groups of the carbon material react with a part of the lead material to form a plurality of lead oxides as a structure of continuous thin films chemically bonded and sandwiched between the lead material and the carbon material; and
cooling down the carbon material and the lead material and then the plurality of lead oxides, serving as a bridge layer, is continuously and chemically connected to the first surface of the carbon material and the lead material.

2. The method as claimed in claim 1, wherein the carbon material includes a plurality of mesopores or micropores.

3. The method as claimed in claim 2, wherein the step of heating the carbon material and the lead material to the first temperature further includes a step of forcing a molten lead material to enter the mesopores or the micropores of the carbon material when the first temperature is higher than melting temperature of the lead material.

4. The method as claimed in claim 1, wherein the first temperature is higher than the temperature at which the part of the oxygen groups of the carbon material are thermally decomposed between the lead material and the carbon material.

5. The method as claimed in claim 1, wherein the carbon material is porous carbon materials.

6. The method as claimed in claim 5, wherein the carbon material is selected from the group consisting of carbon cloth, activated carbon, bamboo carbon and wood charcoal.

* * * * *